(12) United States Patent
Bae et al.

(10) Patent No.: US 8,135,190 B2
(45) Date of Patent: Mar. 13, 2012

(54) METHOD OF REMOVING AN EFFECT OF SIDE LOBES IN FORMING AN ULTRASOUND SYNTHETIC IMAGE

(75) Inventors: Moo Ho Bae, Seoul (KR); Jeong Ho Ham, Seoul (KR)

(73) Assignee: Medison Co., Ltd., Hongchun-gun (KR)

( * ) Notice: Subject to any disclaimer, the term of this patent is extended or adjusted under 35 U.S.C. 154(b) by 726 days.

(21) Appl. No.: 12/257,887

(22) Filed: Oct. 24, 2008

(65) Prior Publication Data
US 2009/0110258 A1     Apr. 30, 2009

(30) Foreign Application Priority Data

Oct. 25, 2007  (KR) .......................... 10-2007-0107947
Sep. 29, 2008  (KR) .......................... 10-2008-0095110

(51) Int. Cl.
*G06K 9/00*   (2006.01)
*A61B 8/00*   (2006.01)

(52) U.S. Cl. ........................................ 382/128; 600/447
(58) Field of Classification Search .................. None
See application file for complete search history.

(56) References Cited

U.S. PATENT DOCUMENTS

| | | |
|---|---|---|
| 4,972,838 A | 11/1990 | Yamazaki |
| 5,438,994 A | 8/1995 | Starosta et al. |
| 5,785,654 A | 7/1998 | Iinuma et al. |
| 5,961,462 A | 10/1999 | Loupas et al. |
| 6,126,604 A | 10/2000 | Bae |

(Continued)

FOREIGN PATENT DOCUMENTS

JP    2-126836    5/1990

(Continued)

OTHER PUBLICATIONS

Kim Lokke Gammelmark, et al., "Duplex Synthetic Aperture Imaging with Tissue Motion Compensation", 2003 IEEE Ultrasonics Symposium Proceedings, Oct. 5, 2003, vol. 2, XP010702293, pp. 1569-1573.

(Continued)

*Primary Examiner* — Jermele M Hollington
(74) *Attorney, Agent, or Firm* — Oblon, Spivak, McClelland, Maier & Neustadt, L.L.P.

(57) ABSTRACT

The present invention relates to a method of removing an effect of side lobes in an ultrasound synthetic image. The method includes: a) setting a plurality of scan lines and defining sequential indices upon the scan lines; b) setting a transmit order of a transmit beam for the scan lines in a non-sequential manner in which increment and decrement of the indices of the scan lines are repeated; c) transmitting the transmit beam based on the set transmit order to obtain a plurality of receive beams in response to each transmission of the transmit beam; d) grouping the receive beams to an increment group corresponding to an increment direction of the numbers of the scan lines and a decrement group corresponding to a decrement direction of the numbers of the scan lines; e) performing an auto correlation upon the receive beams included in the respective increment group and the decrement group; and f) applying weights to the auto correlation results and summing the weight-applied auto correlation results to thereby remove an effect of side lobes.

7 Claims, 8 Drawing Sheets

U.S. PATENT DOCUMENTS

| | | | |
|---|---|---|---|
| 6,231,511 B1 * | 5/2001 | Bae | 600/447 |
| 6,283,918 B1 | 9/2001 | Kanda et al. | |
| 6,352,508 B1 | 3/2002 | Pang et al. | |
| 6,402,694 B1 | 6/2002 | Bae et al. | |
| 2004/0102702 A1 | 5/2004 | Shimazaki | |
| 2005/0043622 A1 * | 2/2005 | Jensen | 600/449 |
| 2009/0112092 A1 * | 4/2009 | Bae et al. | 600/447 |
| 2009/0141957 A1 * | 6/2009 | Yen et al. | 382/131 |
| 2010/0185098 A1 * | 7/2010 | Kim | 600/459 |
| 2010/0191115 A1 * | 7/2010 | Denk | 600/447 |
| 2010/0234729 A1 * | 9/2010 | Bae et al. | 600/441 |
| 2010/0280380 A1 * | 11/2010 | Ham et al. | 600/447 |
| 2011/0054325 A1 * | 3/2011 | Shin et al. | 600/447 |

FOREIGN PATENT DOCUMENTS

| | | |
|---|---|---|
| JP | 9-201361 A | 8/1997 |
| JP | 10-127634 A | 5/1998 |
| JP | 11-164833 | 6/1999 |
| JP | 11-342128 A | 12/1999 |
| KR | 1999-024624 | 4/1999 |
| KR | 2000-0073097 | 12/2000 |

OTHER PUBLICATIONS

Niels Oddershede.et al., "Motion Compensated Beamforming in Synthetic Aperture Vector Flow Imaging", 2006 IEEE Ultrasonics Symposium, Oct. 1, 2006, XP031076694, pp. 2027-2031.

Moo-Ho Bae, et al., "A New Motion Estimation and Compensation Method for Real-Time Ultrasonic Synthetic Aperture Imaging", Ultrasonics Symposium, Oct. 28, 2007, XP 031195271, pp. 1511-1513.

Bülent Tavh, et al., "An Efficient Motion Estimation Technique for Ultrasonic Subaperture Imaging", Engineering in Medicine and Biology Society, vol. 2, Oct. 29, 1998, XP 010320558, pp. 816-819.

Bülent Tavh, et al., "Correlation Processing for Correction of Phase Distortions in Subaperture Imaging", IEEE Transactions on Ultrasonics, Ferroelectrics and Frequency Control, vol. 46, No. 6, Nov. 1, 1999, XP 011090153, pp. 1477-1488.

Chihiro Kasai, et al., "Real-Time Two-Dimensional Blood Flow Imaging Using an Autocorrelation Technique", IEEE Transactions on Sonics and Ultrasonics, vol. 32, No. 3, May 1, 1985, XP 000195697, pp. 458-464.

* cited by examiner

US 8,135,190 B2

METHOD OF REMOVING AN EFFECT OF SIDE LOBES IN FORMING AN ULTRASOUND SYNTHETIC IMAGE

The present application claims priority from Korean Patent Application Nos. 10-2007-0107947 and 10-2008-0095110 filed on Oct. 25, 2007 and Sep. 29, 2008, the entire subject matters of which are incorporated herein by references.

BACKGROUND OF THE INVENTION

1. Technical Field

The present invention generally relates to a method of removing an effect of side lobes, and more particularly to a method of reducing an effect of side lobes with a relative low amount of calculations in forming an ultrasound synthetic image for a moving object to thereby enhance resolution and improve a signal-to-noise ratio (SNR).

2. Background Art

Generally, an ultrasound diagnostic system may use an array transducer for transmitting and receiving ultrasound signals. In order to obtain an enhanced ultrasound image, an ultrasound synthetic image may be adopted. The ultrasound synthetic image may be formed by using receive dynamic focusing for forming multi-receive beams in response to one time transmission of a transmit beam. The ultrasound diagnostic system may synthesize the receive beams corresponding to the same scan line obtained through a plurality of transmissions of the transmit beam along a plurality of scan lines to thereby form an ultrasound synthetic image. For example, assuming that the transmit beam is transmitted along a $n^{th}$ scan line ($S_n$), the ultrasound diagnostic system may form (2m+1) numbers of receive beams corresponding to scan lines $S_{n-m}$, $S_{n-(m-1)}$, ..., $S_n$, ..., $S_{n+(m-1)}$, $S_{n+m}$, wherein m>0. As shown in FIG. 1, when the transmit beam is focused along a scan line $S_n$, three receive beams may be formed based on echo signals from scan lines $S_{n-1}$, $S_n$ and $S_{n+1}$. That is, three receive beams may be obtained per each scan line and the receive beams are then synthesized to form an ultrasound synthetic image.

When a target object is a stationary object, an ultrasound synthetic having good resolution and signal to noise ration may be obtained. However, when the target object is a moving object (especially moving in an axial direction), an undesirable image may be displayed in forming an ultrasound synthetic image. That is, the ultrasound synthetic image may be formed by using receive beams obtained with a time delay or multiple transmit beams such as bi-directional pixel based focusing. Thus, if a motion occurs in the target object and beam forming is carried out without considering the motion, then an incoherent sum may occur, which makes contrast resolution and SNR lowered.

Various pixel based researches or area based researches have been conducted in order to estimate and compensate a motion that occurred in the ultrasound synthetic image. There are proposed methods for estimating and compensating the motion by using cross correlation, auto correlation, sum of absolute difference, etc. There is a problem in that the pixel based motion estimation and compensation requires a large amount of calculation.

DETAILED DESCRIPTION OF THE INVENTION

The present invention is directed to removing an effect caused by side lobes with a relatively low amount of calculation in an ultrasound synthetic image to thereby enhance resolution and compensate a signal to noise ratio (SNR) for degradation. The present invention may adjust the transmit order of a transmit beam for scan lines, thereby removing factors having unnecessary phases caused by the side lobes. This is so that a radio frequency (RF) pixel (or sample unit) based motion estimation and compensation may be achieved with a relatively low amount of calculation. The present invention is simulated based on bidirectional pixel based focusing (BIPBF) and the proposed method may be applied to a general synthetic imaging method of ultrasound images.

Generally, the ultrasound synthetic image may be formed by using one of a receive synthetic-aperture focusing method or a transmit synthetic-aperture focusing method. The receive synthetic-aperture focusing method is a technique applied to a commercial equipment. Multi-receive beams may be formed and stored by repeatedly performing transmission and reception of ultrasound signals for the scan lines and then the stored receive beams are synthesized. This is so that an ultrasound synthetic image can be obtained according to the receive synthetic-aperture focusing method. The transmit synthetic-aperture focusing method may have an effect relatively increasing an ultrasound transmit power by using ultrasound signals generated in a plurality of transmit fields instead of a single transmit field.

The BiPBF method may perform transmit and receive focusing for all points based on the transmit synthetic-aperture focusing method. As illustrated in FIG. 2B, the BiPBF method may be translated by referring to a transmit focal point as a virtual source element.

Figure 1:
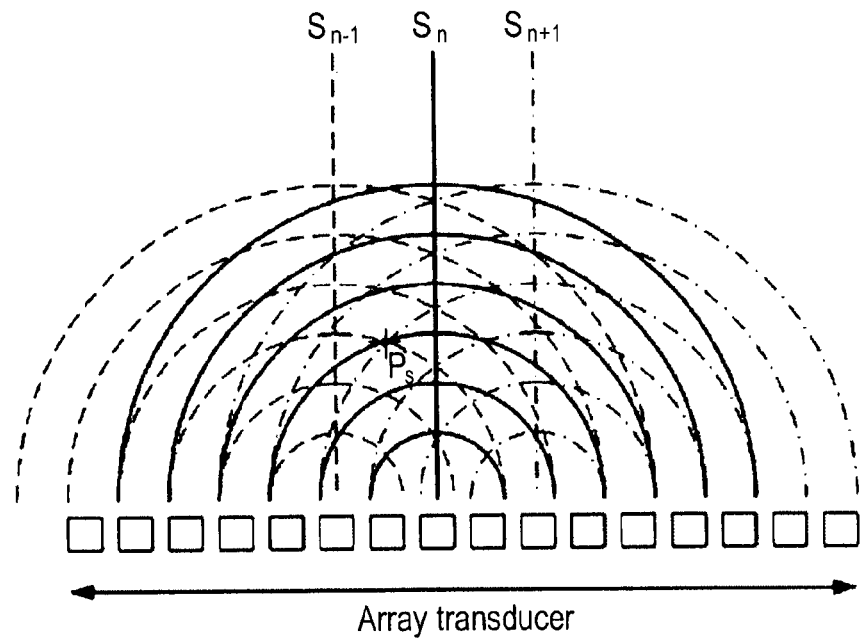
FIG. 1 is a schematic diagram showing a procedure of forming a general synthetic image.
Figure 2A:
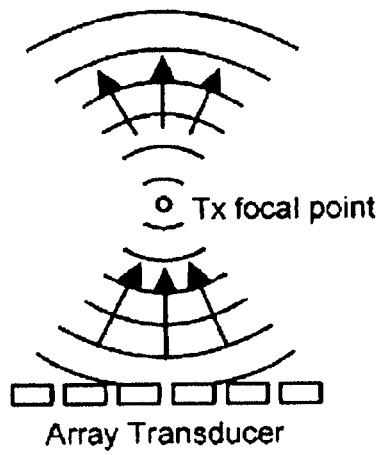
FIG. 2A shows a transmit fields in a brightness (B) mode with the array transducer.
Figure 2B:
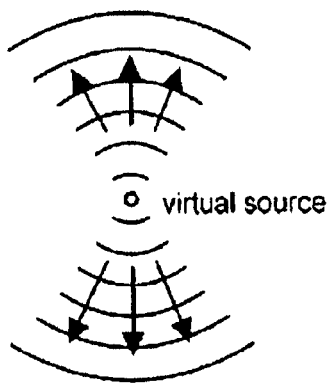
FIG. 2B shows a virtual source element located at a focal depth in a B mode.
Figure 2C:
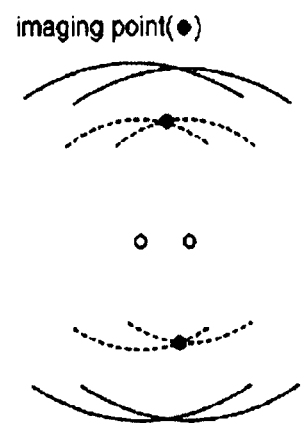
FIG. 2C shows a superposition of transmit fields of two virtual source elements at imaging points.

FIG. 2A shows a transmit field in a brightness (B) mode with the array transducer. As shown in FIG. 2A, the transmit field, which is radiated from the array transducer, converges toward a focal point and then diverges in the form of a circular wave within a limited angular extent. FIG. 2B shows a virtual source element located at a focal depth in the B mode. The virtual source element may generate a circular wave back and forth with respect to itself. FIG. 2C shows a superposition of transmit fields of two virtual source elements at imaging points. As shown in FIG. 2C, one imaging point is shown before the focal depth and the other imaging point is shown after the focal depth with respect to a center of symmetry of the circular field.

The BiPBF method may be able to maintain a uniform lateral resolution over all focal depths and reduce a side lobe level compared to other methods. Also, since the transmit power increases due to the synthesis of transmit fields, an ultrasound synthetic image having an enhanced SNR may be obtained through the BiPBF method. However, the use of the BiPBF method may be restricted to imaging a stationary or slowly moving object. If the BiPBF method is applied for imaging a fast moving object, then the resolution may be degraded or the target object may disappear in the ultrasound synthetic image. Especially, a motion occurring in an axial direction may largely affect the ultrasound synthetic image compared to a motion occurring in a lateral direction.

A motion occurring may be confidentially recognized by using 2-dimensional tissue Doppler imaging (2D-TDI). The 2D-TDI may repeatedly transmit an ultrasound signal with an identical acoustic field at a constant time interval and detect a phase change of echo signals to thereby find a mean Doppler frequency by using auto correlation or other methods.

The synthetic aperture imaging (SAI) may be similar to the 2D-TDI in terms of repeatedly transmitting an ultrasound signal. However, the SAI may transmit an ultrasound sound signal in a different acoustic field per transmission, which is different from the 2D-TDI for transmitting the ultrasound signal with the identical acoustic field per transmission. In the SAI, a wave plane of the acoustic field may be rotated in a constant angle per each transmit in view of each of the pixels. This rotation may cause the side lobes in a low resolution image formed based on each transmission to be also rotated.

Thus, in case of a main lobe of an independent target object, a motion in an axial direction may be found to be similar to a tissue Doppler. However, a wrong motion may be detected at a position of side lobes of the target object even at adjacencies of the target object, which is not moved. Thus, the present invention adopts a new transmit order of a transmit beam (i.e., a specified transmit order) for the scan lines and a phase detecting method through auto correlation for compensating for the wrongly detected motion.

Hereinafter, a problem caused by the side lobes in the low resolution image will be verified through the auto correlation for a stationary object and a moving object. A procedure using the new transmit order the transmit beam (i.e., not sequential but not non-sequential) and the auto correlation for calculating mean phase of receive beams to remove the effect caused by the side lobes and overcome limitation of amount of calculations will be described in detail. Since the motion may be estimated and compensated in a pixel with a relatively low amount of calculation, a uniform resolution of an ultrasound synthetic image for the moving object may be maintained identical to that of the stationary object.

Figure 3:
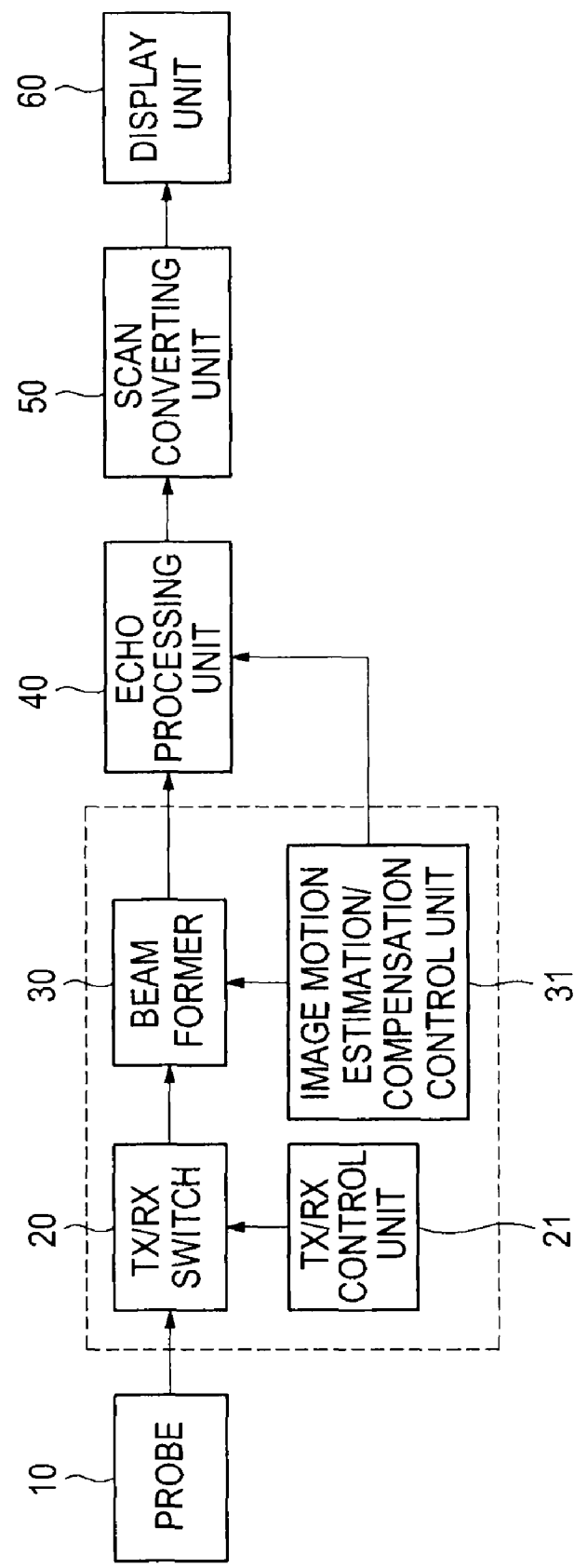
FIG. 3 is a schematic block diagram illustrating an ultrasound diagnostic system in accordance with one embodiment of the present invention.
Figure 4:
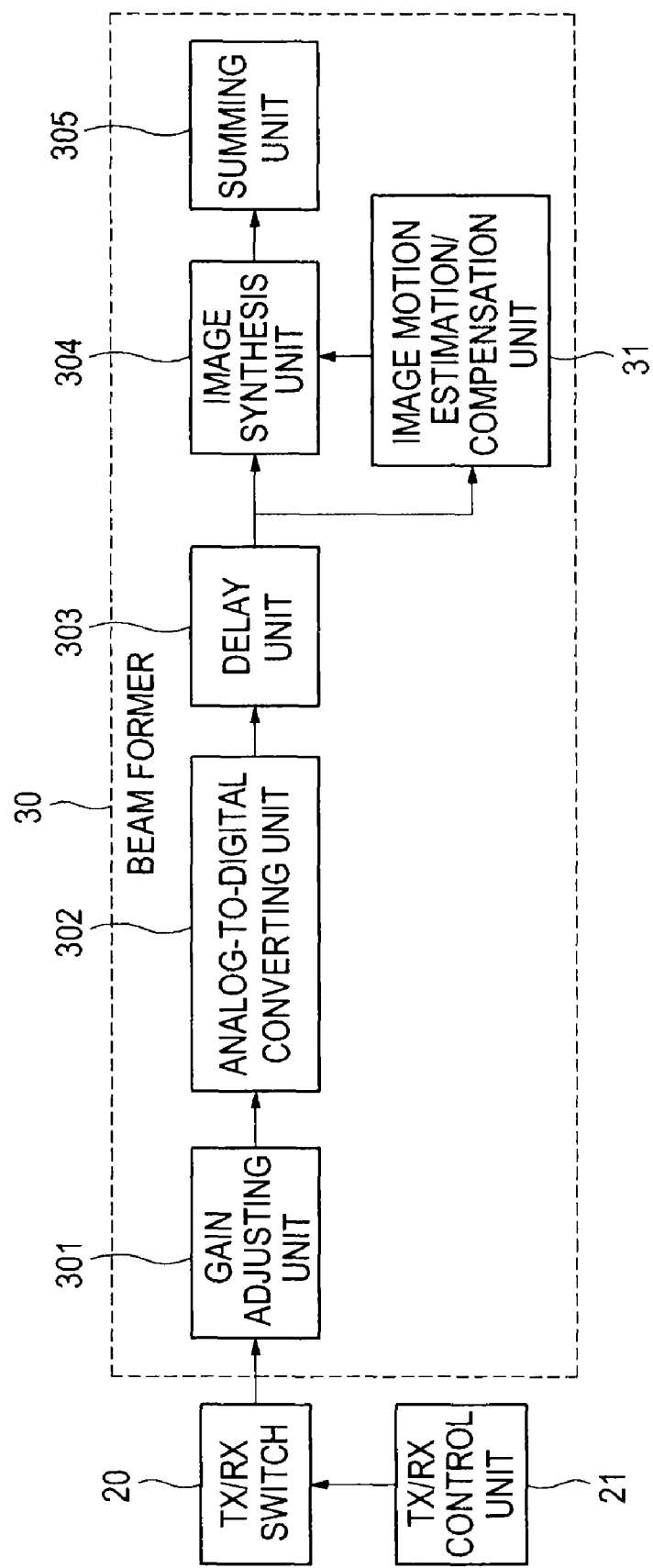
FIG. 4 is a schematic block diagram illustrating a beam former.
Figure 5:
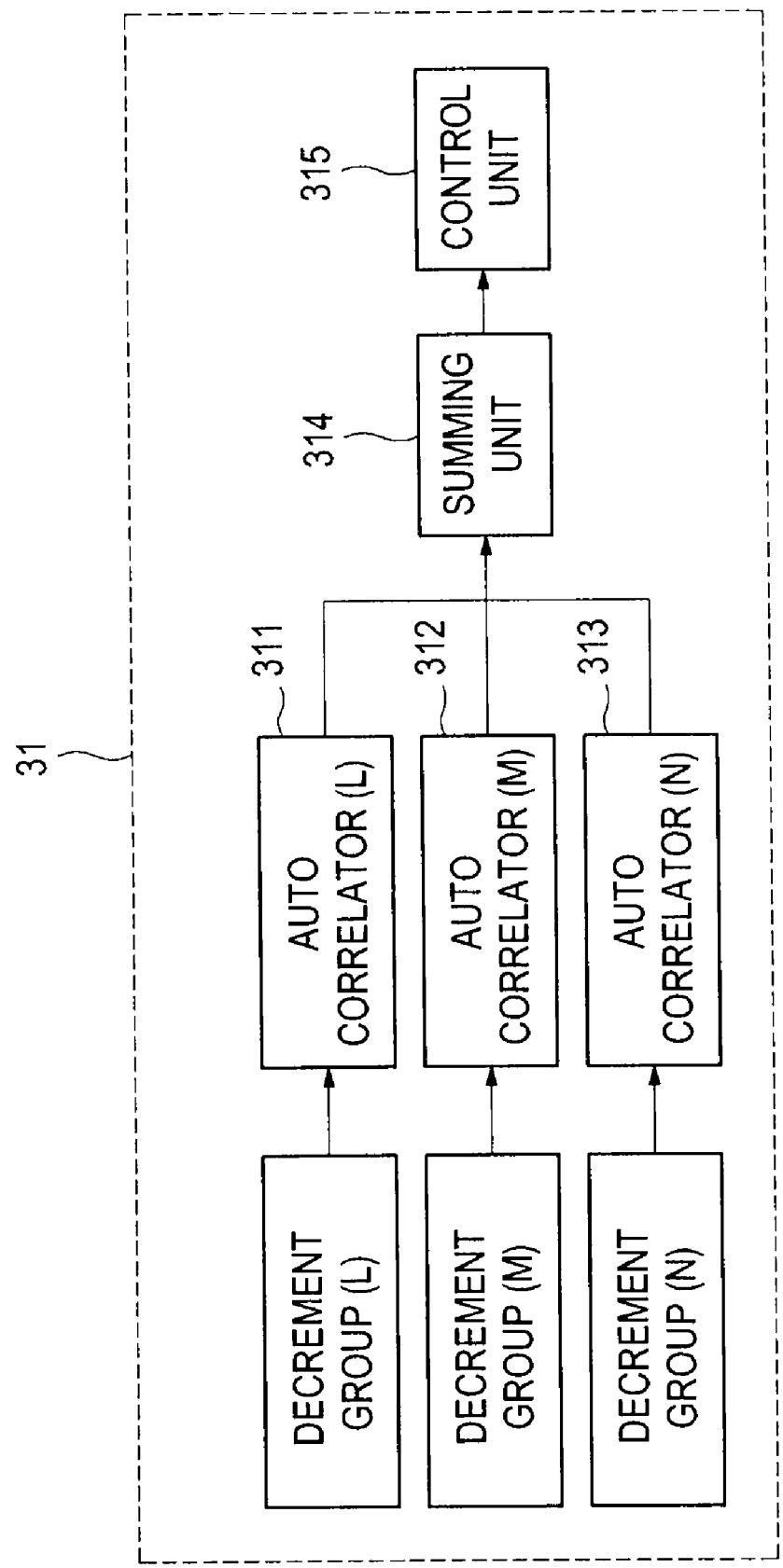
FIG. 5 is a schematic block diagram illustrating an image motion estimation/compensation unit.

FIG. 3 is a schematic block diagram illustrating an ultrasound diagnostic system in accordance with one embodiment of the present invention. FIGS. 4 and 5 are schematic block diagrams illustrating a beam former and an image motion estimation/compensation unit.

A probe 10 may include an array transducer and may be operable to transmit and receive ultrasound signals. The probe 10 may further include a transmitter (not shown) and an analog receiver (not shown). The array transducer may comprise a plurality of elements (e.g., 128 elements) and may be operable to output the ultrasound signals in response to transmit pulses applied from the transmitter. The analog receiver may be operable to amplify electrical receive signal outputted from the array transducer in response to echo signals, remove aliasing phenomenon and noises, and compensate attenuation due to propagation of the ultrasound signals in the target object.

A transmit/receive switch 20 may be operable to switch transmission and reception of the ultrasound signals for the same elements. The transmit/receive switch 20 may be further operable to prevent a high power outputted from the transmitter from affecting the analog receiver. That is, when the transmission and the reception are alternately carried out, the transmit/receive switch 20 may be operable to appropriately switch the transmitter and the analog receive.

A beam former 30 may be operable to sample the electric receive signals outputted from the transducer elements in response to the echo signals and perform receive focusing upon the sampled electric receive signals. As shown in FIG. 4, the beam former 30 may include a gain adjusting unit 301, an analog-to-digital converting unit 302, a delay unit 303, an image synthesizing unit 304 and a summing unit 305. The gain adjusting unit 301 may be operable to compensate gain of the analog receive signals received at the analog receiver. The analog-to-digital converting unit may be operable to convert the analog receive signals to digital receive signals. The delay unit 303 may be operable to apply a different amount of delay to the digital receive signals based on distance differences between the respective elements and a focal point. The image synthesizing unit 304 may be operable to synthesize the delayed digital receive signals to thereby form a receive-focused beam of a radio frequency (RF). The summing unit 305 may be operable to sum the receive-focused beams form at respective channels.

An echo processing unit 40 may be operable to convert the RF receive-focused beam into a baseband signal and perform envelop detection with a quadrature demodulator, thereby obtaining an ultrasound image data corresponding to scan lines.

A scan converting unit 50 may be operable to scan-convert the ultrasound image data in a format capable of being displayed on a display unit 60. That is, the scan converting unit 50 may be operable to convert the ultrasound image data in an appropriate data format capable of being displayed on the display unit 60. The display unit 60 may be operable to receive the scan-converted ultrasound image data to display an ultrasound image of the target object.

Figure 6:
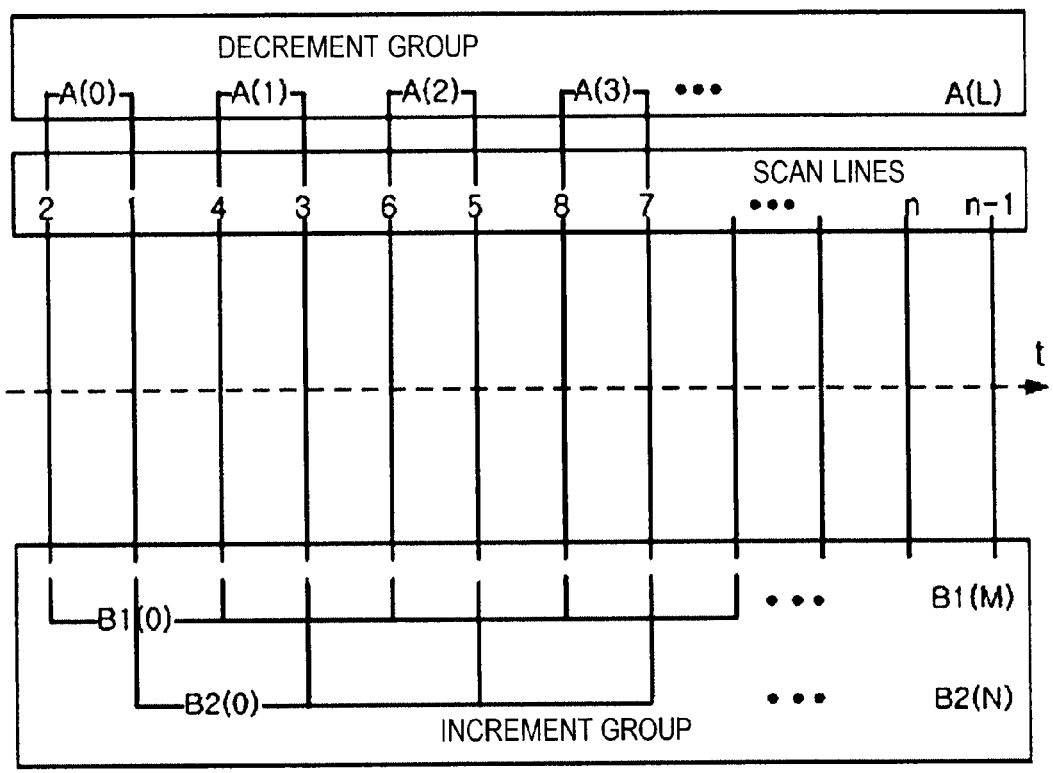
FIG. 6 is an exemplary diagram showing a non-sequential transmit order of a transmit beam for a plurality of scan lines in accordance with one embodiment of the present invention.

An ultimate aim of the present invention is to maintain uniform resolution of an ultrasound synthetic image for a moving object identical to that of a stationary object through motion estimation and compensation of the moving object in an ultrasound synthetic imaging procedure. As such, the present invention may provide the non-sequential transmit order of the transmit beam for the scan lines and generate data necessary for motion estimation and compensation (e.g., phase data formed in a pixel unit or a sample unit) based on receive beams obtained in response to the transmit beam. The data may be inputted into auto correlators 311-313 by grouping the receive beams based on the transmit order. That is, the present invention may set a specific transmit order of the transmit beam for the scan lines (see FIG. 6) through a transmit/receive control unit 21. The scan lines may be grouped with a decrement group and an increment group. The detailed description for grouping of the scan lines will be provided later. As illustrated in FIG. 6, M and N numbers of receive beams responsive to the increment group and L numbers of receive beams responsive to the decrement group may be obtained. The receive beams may be inputted to the auto correlators 311-313. The auto correlators 311-313 may be operable to calculate phases from the inputted receive beams in a pixel unit or a sample unit and provide phase information for motion estimation and compensation based on the calculated phases. Thereafter, a control unit 315 of an image motion estimation/compensation control unit 31 may be operable to calculate a velocity of the motion based on the phase information and compensate the motion by adjusting receive delay time based on the calculated velocity per each pixel. This is so that the resolution of an ultrasound synthetic image for a moving object may be uniformly maintained identical to that of an ultrasound synthetic image for a stationary object. Although it is illustrated that the image motion estimation/compensation control unit 31 is installed at an outside of the beam former 30 in FIGS. 3 and 4, the image motion estimation/compensation control unit 31 may be installed in the beam former 30. It should be noted herein that the position for installing the image motion estimation/compensation control unit 31 is not limited thereto.

As mentioned above, the transmit/receive control unit 21 of the present invention may set not the sequential transmit order for the scan lines but the non-sequential transmit order. Further, the auto correlators 311-313 of the image motion estimation/compensation control unit 31 may detect phases at the respective pixels with auto correlation function from the receive beams responsive to the transmission of the transmit beams in the non-sequential transmit order for the scan lines. This is so that an effect due to the side lobes may be removed with a relatively low amount of calculation. Thus, since the control unit 315 of the image motion estimation/compensation control unit 31 may estimate and compensate the motion of a moving object in the ultrasound synthetic imaging process, the resolution of the image for the moving object may be uniformly maintained identical to that of the ultrasound synthetic image for the stationary object. The present invention will be dominantly described for a control procedure for the image motion estimation and compensation (i.e., extraction of phases necessary for the motion estimation and compensation). The image motion estimation and compensation process (i.e., calculation of velocity of moving object based on the phase information and compensation for the motion based on the calculated velocity, e.g., compensation for focusing delay time based on the calculated velocities for the pixels) will be additionally described.

First, a phase status of a main lobe and a side lobe in an ultrasound synthetic image for a stationary object and an ultrasound synthetic image for a moving object will be checked through the low resolution images. Then, the phase status will be re-checked after setting a new transmit order of the transmit beams for the scan lines in accordance with the present invention.

Figure 7:
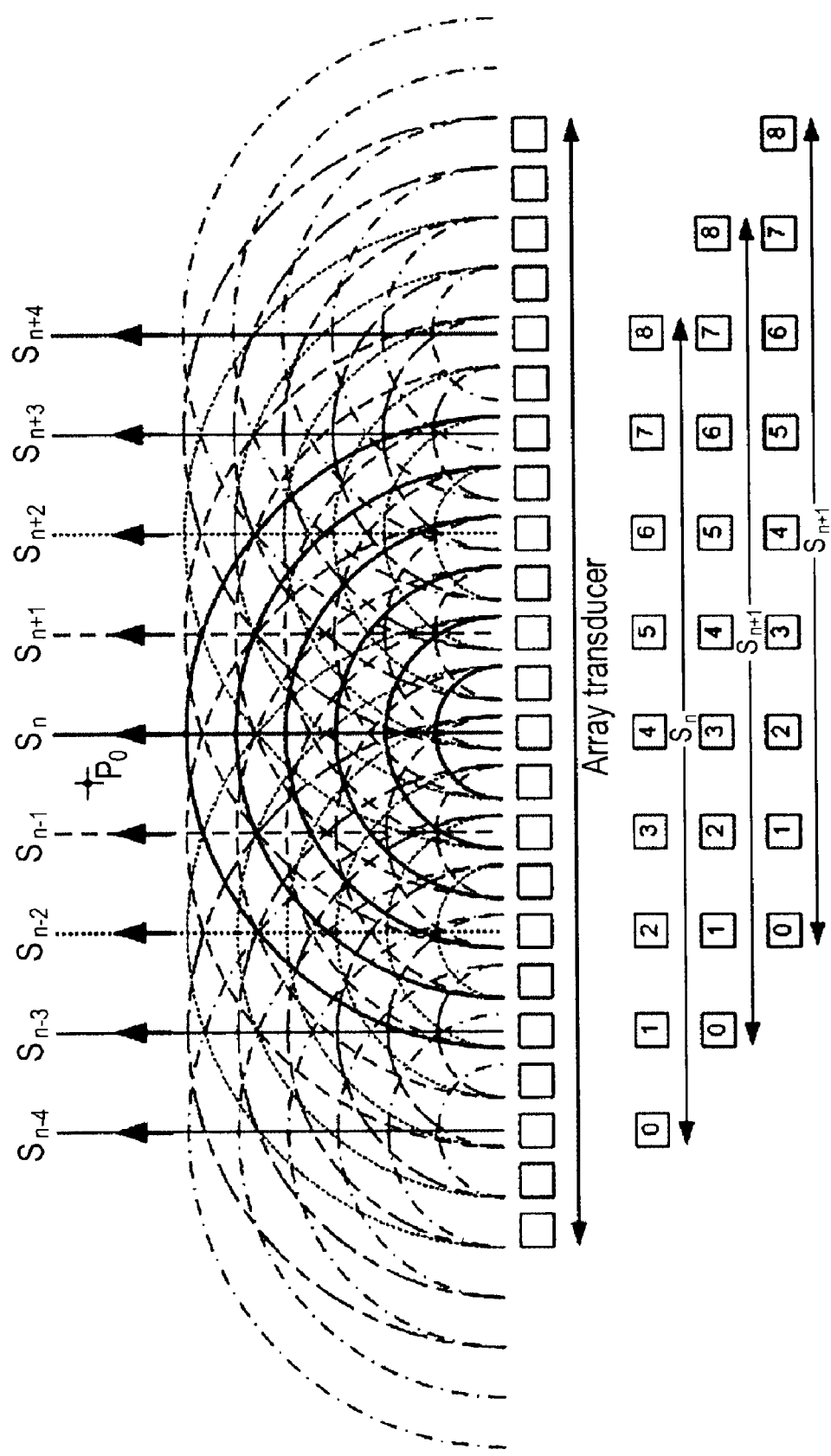
FIG. 7 is a schematic diagram showing an example of a synthetic aperture imaging method by using BiPBF.

FIG. 7 is a schematic diagram showing an example of a synthetic aperture imaging method by using the BiPBF. As illustrated in FIG. 7, a plurality of scan lines (N=9) participate in forming the receive beams in response to one transmission of a transmit beam. Whenever the scan line for transmission is moved, the participated scan lines for forming the receive beams are also moved. The numbers 0-8 represent an index order for auto correlation and N (=9) is the number of the scan lines participating in forming receive beams in response to one transmission of a transmit beam. N may be an ensemble number. The mean phase may be calculated at each of the pixels by using the ensemble number of the receive beams at the auto correlation function.

Figure 8:
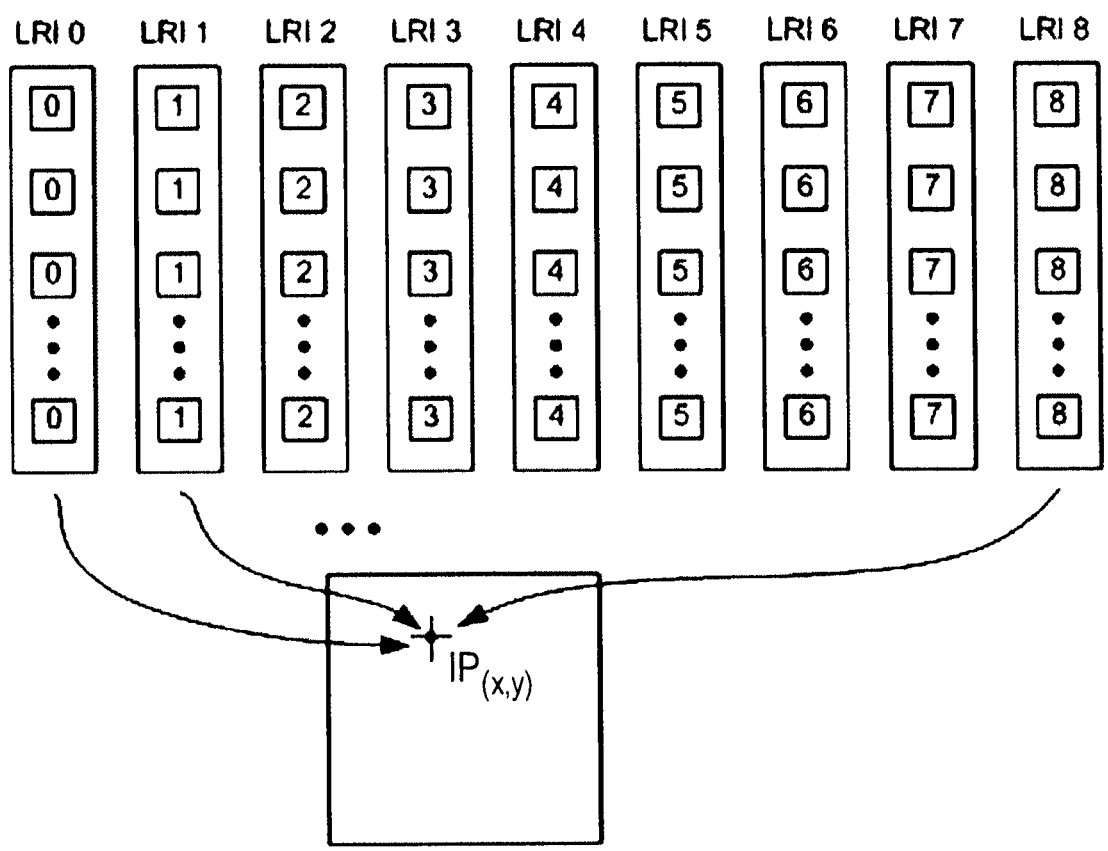
FIG. 8 is a schematic diagram showing a method of obtaining a synthesis data at an arbitrary imaging point by using a plurality of low resolution images.

Since N=9, a low resolution image may be formed based on 9 receive beams obtained in response to one time of transmit focusing for an arbitrary scan line. Also, if the transmit focusing is shifted one by one to a next scan line, then 9 receive beams may be obtained for the corresponding transmit scan lines. Thus, when N=9, a phase change of an arbitrary pixel point P0 may be calculated from 9 low resolution images as shown in FIG. 8.

In the ultrasound synthetic image obtained by using the BiPBF for a stationary object, an image for a main lobe may be indicated in the shape of a black hole as a correlation result since the phases for the main lobe are not changed. However, a phase may be changed due to the side lobe in spite of the stationary object. The phase change becomes lower close to the main lobe. Thus, the phase change due to the side lobe should be minimized.

Hereinafter, an auto correlation procedure for the receive beams obtained through the transmission of the specific transmit order of the transmit beam for the scan lines for a stationary object will described in detail.

When a moving velocity of the target object is calculated by using a phase change obtained through the auto correlation, the moving velocity should be 0 m/s in case of the stationary target object. However, a velocity component may be detected due to the effect of the side lobe in the ultrasound synthetic image. That is, if the transmit focusing is carried out in a sequential transmit order for the scan lines, then a phase for the main lobe is not changed, but a phase for the side lobe is rotated in a constant pattern in an x-y space. Thus, the present invention may set the transmit order of the transmit beam for the scan lines in a non-sequential manner to minimize the effect of the side lobes and then perform the auto correlation for the receive beams obtained in response to the newly set transmit order.

FIG. 6 is a schematic diagram showing an example of the specific transmit order of the transmit beam for the scan lines in accordance with one embodiment of the present invention. In order to set the transmit order, the scan lines are defined with sequential indices and the transmit order of the transmit beam for the scan lines is set in a non-sequential manner in which increment and decrement of the indices of the scan lines are repeated. As shown in FIG. 6, the transmit scan lines may be divided into a scan line increment group and a scan line decrement group. Further, the increment and decrement may be set as +2 and −1, respectively. For example, the transmission for the scan lines may be carried out in a rearranged transmit order such as 2, 1, 4, 3, 6, 5. . . instead of a sequential order such as 1, 2, 3, 4. . ., i.e., the transmit order is rearranged such that the decrement and increment of −1 and +2 are to be repeated. In such a case, assuming that a phase difference between receive beams obtained in response to the first transmission and the second transmission is indicated as a(1, 3), a mean phase difference calculated from a(2, 4), a(3, 5), a(8, 10), etc. (i.e., B group having a number difference of +2) for pixels located in the side lobe of the stationary target object may be denoted as B. Also, a mean phase difference calculated from a(2, 1), a(4, 3), a(6, 5), etc (i.e., A group having a number difference of −1) may be denoted as A. If the mean phase differences for the stationary target object are denoted as A and B, then the following equation (1) may be approximately obtained.

$$B = -2A \tag{1}$$

$$A + \frac{1}{2} \times B = 0 \tag{2}$$

As shown in the equation (2), after A and B are individually calculated at each pixel, if weights are applied to A and B and then results are summed, then the wrong motion detection due to the rotation of the side lobe may be cancelled. Also, in case of the moving target object, even if a transmit order for the transmit scan lines is changed, the rotation of the phase due to the movement of the target object for each transmission may be defined as the following equation (3). Thus, if weights are applied and the applied results are summed, then a moving velocity of the target object may be accurately calculated such as the general 2D-TDI.

$$B = 2A \quad (3)$$

Thus, the unnecessary phase difference due to the rotation of the side lobe may be reduced and only a phase difference due to movement of the main lobe may be observed. The mean phase may be calculated by using the auto correlation. The auto correlation may be carried out as follows. Function $z_1(f)$ may be defined by functions $z(t)$ and $z^*(t-T)$ as the following equation (4)

$$z_1(t) = z(t) \times z^*(t-T) \quad (4)$$

$$z^*(t-T) = x(t-T) - jy(t-T) \quad (5)$$

wherein $z^*(t-T)$ is a conjugate complex delayed by a delay time T from the function $z(t)$ as shown in the equation (5). If the function $z_1(t)$ is integrated over a specific time, then a result of the auto correlation function may be obtained as the following equation (6).

$$R(T,t) = \int_{-nT} z_1(t') dt' = R_x(T,t) + jR_y(T,t) \quad (6)$$

wherein n represents the number of the consecutive transmit pulses in a constant direction, which is referred to as an ensemble number in an ultrasound image.

The following equation (7) represents an auto correlation function for the receive beams corresponding to the increment group having the increment of +2. The following equations (8) and (9) represent the power and phase of the receive beams corresponding to the increment group. This process is carried out by an auto correlator 312 for the receive beams corresponding to the increment group among the auto correlators 311-313 of the image motion estimation/compensation control unit 31.

$$R_I(T_I, t) = \int_{-n_I T_I} z_{1I}(t') dt' \quad (7)$$
$$= R_{xI}(T_I, t) + jR_{yI}(T_I, t)$$

$$|R_I(T_I, t)| = \sqrt{R_{xI}^2(T_I, t) + jR_{yI}^2(T_I, t)} \quad (8)$$

$$\Phi(T_I, t) = \tan^{-1} \frac{R_{yI}(T_I, t)}{R_{xI}(T_I, t)} \quad (9)$$

If a phase is calculated by applying a weight to the equation (9), then the following equation (10) may be obtained.

$$\Phi_S(T_I, t) = \frac{1}{2} \times \tan^{-1} \frac{R_{yI}(T_I, t)}{R_{xI}(T_I, t)} \quad (10)$$

The final results for the receive beams corresponding to the increment group may be expressed as the following equations (11) and (12).

$$R_{Sx1}(T_1, t) = |R_1(T_1, t)| \times \cos(\Phi_S(T_1, t)) \quad (11)$$

$$R_{Sy1}(T_1, t) = |R_1(T_1, t)| \times \sin(\Phi_S(T_1, t)) \quad (12)$$

The final results for the receive beams corresponding to the decrement group having the decrement of −1 may be expressed as the following equations (13) to (15).

$$R_D(T_D, t) = \int_{-n_D T_D} z_{1D}(t') dt' \quad (13)$$
$$= R_{xD}(T_D, t) + jR_{yD}(T_D, t)$$

$$|R_D(T_D, t)| = \sqrt{R_{xD}^2(T_D, t) + jR_{yD}^2(T_D, t)} \quad (14)$$

$$\Phi(T_D, t) = \tan^{-1} \frac{R_{yD}(T_D, t)}{R_{xD}(T_D, t)} \quad (15)$$

A complex value summing the calculated phases of the receive beams for the increment group and the decrement group, which are obtained by the auto correlators 311-313 of the image motion estimation/compensation control unit 31, may be expressed as the following equations (16) and (17). The summation may be carried out by the summation unit 314 of the image motion estimation/compensation control unit 31.

$$R_{Tx}(T,t) = R_{Sx1}(T_1,t) + R_{xD}(T_D,t) \quad (16)$$

$$R_{Ty}(T,t) = R_{Sy1}(T_1,t) + R_{yD}(T_D,t) \quad (17)$$

The power of the corresponding pixel or sample may be defined as the following equation (18) and the phase may be defined as the following equation (19).

$$|R_T(T, t)| = \sqrt{R_{Tx}^2(T, t) + jR_{Ty}^2(T, t)} \quad (18)$$

$$\Phi_T(T, t) = \tan^{-1} \frac{R_{Ty}(T, t)}{R_{Tx}(T, t)} \quad (19)$$

The equation (19) represents a pixel based mean phase. By using this, a specific area based mean phase can be obtained. As such, the result of the equations (16) and (17) may be expressed in space coordinates as the following equation (20).

$$R_{Tx}(T,t) \to R_{Px}(s,z), R_{Ty}(T,t) \to R_{Py}(s,z) \quad (20)$$

The equation (20) may be expressed as the following equations (21) and (22) so that it can be extended to a type having a specific area based mean phase.

$$R_{Rx}(i, j) = \frac{1}{k} \sum_{s=1}^{m} \sum_{z=n}^{0} R_{Px}(s, z) \quad (21)$$

$$R_{Ry}(i, j) = \frac{1}{k} \sum_{s=1}^{m} \sum_{z=n}^{0} R_{Py}(s, z) \quad (22)$$

In order to compensate the motion of the target object, the estimated phase should be transformed to a distance. A velocity of the target object may be calculated by using the following equation (23).

$$V_{target} = \Phi_T \times \frac{c}{2 \times f0} \times \frac{PRF}{2 \times \pi} \quad (23)$$

wherein $V_{target}$ represents a velocity of the target object, c represents an acoustic velocity, f0 represents a center frequency of the transducer and PRF is a transmit repetition frequency. The distance may be calculated by using the calculated velocity of the target object as the following equation (24).

$$z_{mtarget} = V_{target} \times \frac{1}{PRF} \qquad (24)$$

The motion compensation may be carried out by compensating the transmit focusing delay time and the receive focusing delay time based on the estimated velocity per each pixel, or additionally applying motion compensation focusing delay time without changing the transmit focusing delay time and the receive focusing delay time, which are set by not considering the motion. If a power threshold is appropriately adjusted in the auto correlation, then it is effective to reduce an effect of the side lobes.

Figure 9:
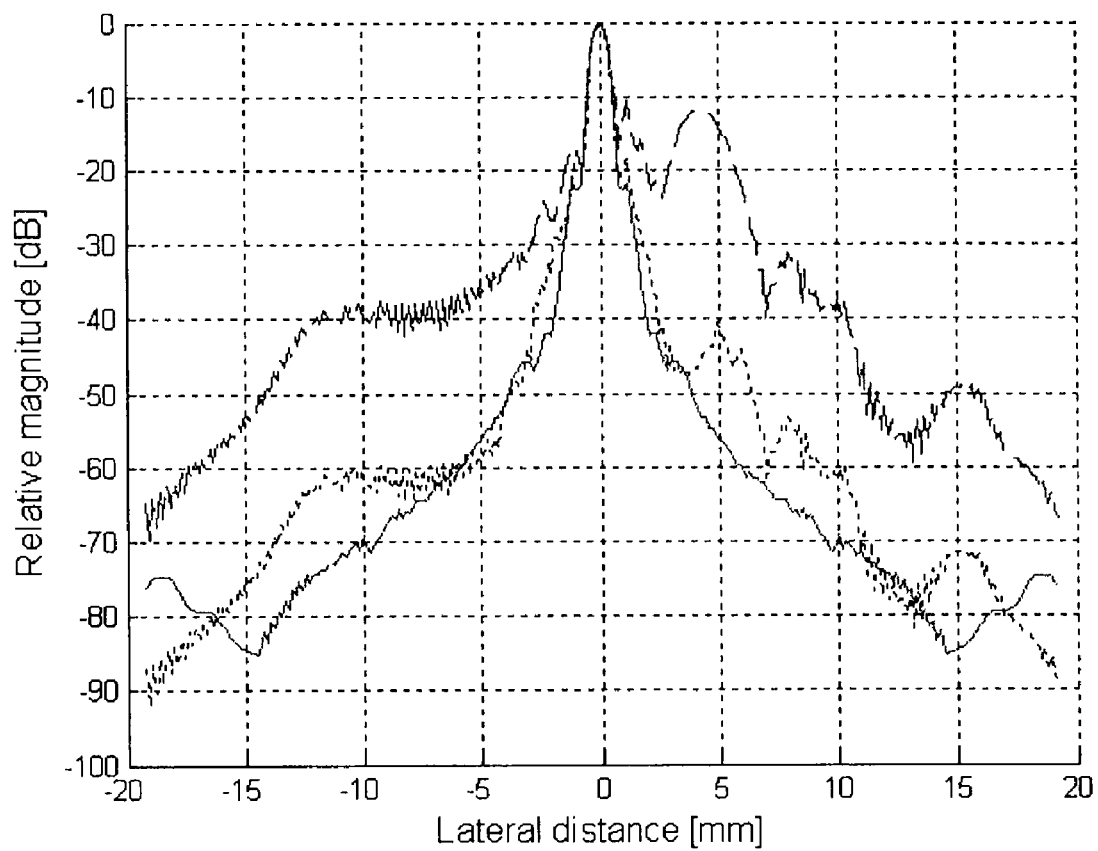
FIG. 9 is a graph showing lateral beam width for the maximum values on the scan lines.

FIG. 9 is a graph showing lateral beam width for the maximum values on the scan lines. The solid line represents a case for a stationary object and the dashed line represents a case for a moving object without motion compensation. The dotted line represents a case for a moving object with motion compensation in accordance with one embodiment of the present invention. As shown in FIG. 9, the motion may be compensated in accordance with the present invention.

As mentioned above, the present invention may set a transmit order for the scan lines in a non-sequential manner so that there is a merit in reducing the effect due to the side lobes. Thus, the motion in the moving object may be accurately estimated and compensated so that a motion artifact, which may occur in forming an ultrasound synthetic image by using the BiPBF method, may be reduced. Also, since the auto correlation may be carried with a relatively low amount of calculation, the synthetic imaging process may be carried out in real time.

In accordance with one embodiment of the present invention, there is provided an method of removing an effect of side lobes in forming an ultrasound synthetic image having a plurality of pixels, comprising: a) setting a plurality of scan lines and defining sequential indices upon the scan lines; b) setting a transmit order of a transmit beam for the scan lines in a non-sequential manner in which increment and decrement of the indices of the scan lines are repeated; c) transmitting the transmit beam based on the set transmit order to obtain a plurality of receive beams in response to each transmission of the transmit beam; d) grouping the receive beams to an increment group corresponding to an increment direction of the numbers of the scan lines and a decrement group corresponding to a decrement direction of the numbers of the scan lines; e) performing auto correlation upon the receive beams included in the respective increment group and the decrement group; and f) applying weights to the auto correlation results and summing the weight-applied auto correlation results to thereby remove an effect of side lobes.

Any reference in this specification to "one embodiment," "an embodiment," "example embodiment," etc. means that a particular feature, structure or characteristic described in connection with the embodiment is included in at least one embodiment of the present invention. The appearances of such phrases in various places in the specification are not necessarily all referring to the same embodiment. Further, when a particular feature, structure or characteristic is described in connection with any embodiment, it is submitted that it is within the purview of one skilled in the art to effect such feature, structure or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of removing an effect of side lobes in forming an ultrasound synthetic image having a plurality of pixels in an ultrasound diagnostic device including a transmit/receive control unit, a probe and a beam former, the method comprising:
   a) setting, via the transmit/receive control unit of the ultrasound diagnostic device, a plurality of scan lines and defining sequential indices upon the scan lines;
   b) setting, via the transmit/receive control unit of the ultrasound diagnostic device, a transmit order of transmit beams for the scan lines in a manner according to sequentially ordered scan indices set by alternately decrementing and incrementing a predetermined scan line index of the scan line indices by −1 and +3, respectively;
   c) transmitting, via the probe of the ultrasound diagnostic device, the transmit beam based on the set transmit order to obtain a plurality of receive beams in response to each transmission of the transmit beam;
   d) grouping, via the beam former of the ultrasound diagnostic device, the receive beams to an increment group corresponding to a plurality of scan line pairs of the scan lines, each pair having an index difference of +2, and a decrement group corresponding to a plurality of scan line pairs of the scan lines each pair having an index difference of −1;
   e) performing, via the beam former of the ultrasound diagnostic device, an auto correlation upon the receive beams included in the respective increment group and the decrement group; and
   f) determining, via the beam former of the ultrasound diagnostic device, weights based on mean phase differences of the increment and decrement groups, applying the weights to the auto correlation results and summing the weight-applied auto correlation results to thereby remove said effect of side lobes.

2. The method of claim 1, wherein the auto correlation is carried out in a pixel unit.

3. The method of claim 1, wherein the receive beams are obtained by sampling echo signals in response to the transmission of the transmit beam.

4. The method of claim 3, wherein the auto correlation is carried out in a sampling unit.

5. The method of claim 1, wherein the receive beams are obtained by using bi-directional pixel based focusing.

6. An ultrasound diagnostic device that removes an effect of side lobes in forming an ultrasound synthetic image having a plurality of pixels, the ultrasound diagnostic device comprising:
   a transmit/receive control unit that sets a plurality of scan lines and defines sequential indices upon the scan lines, and sets a transmit order of transmit beams for the scan lines in a manner according to sequentially ordered scan indices set by alternately decrementing and incrementing a predetermined scan line index of the scan line indices by −1 and +3, respectively;

a probe that transmits the transmit beam based on the set transmit order to obtain a plurality of receive beams in response to each transmission of the transmit beam; and a beam former that groups the receive beams to an increment group corresponding to a plurality of scan line pairs of the scan lines, each pair having an index difference of +2, and a decrement group corresponding to a plurality of scan line pairs of the scan lines each pair having an index difference of −1, performs an auto correlation upon the receive beams included in the respective increment group and the decrement group, determines weights based on mean phase differences of the increment and decrement groups, applies the weights to the auto correlation results, and sums the weight-applied auto correlation results to thereby remove said effect of side lobes.

7. A non-transitory computer-readable medium including computer program instructions, which when executed by an ultrasound diagnostic device, causes the ultrasound diagnostic device to perform a method of removing an effect of side lobes in forming an ultrasound synthetic image having a plurality of pixels, the method comprising:

setting a plurality of scan lines;

defining sequential indices upon the scan lines;

setting a transmit order of transmit beams for the scan lines in a manner according to sequentially ordered scan indices set by alternately decrementing and incrementing a predetermined scan line index of the scan line indices by −1 and +3, respectively;

transmitting the transmit beam based on the set transmit order to obtain a plurality of receive beams in response to each transmission of the transmit beam;

grouping the receive beams to an increment group corresponding to a plurality of scan line pairs of the scan lines, each pair having an index difference of +2, and a decrement group corresponding to a plurality of scan line pairs of the scan lines each pair having an index difference of −1;

performing an auto correlation upon the receive beams included in the respective increment group and the decrement group;

determining weights based on mean phase differences of the increment and decrement groups;

applying the weights to the auto correlation results; and summing the weight-applied auto correlation results to thereby remove said effect of side lobes.

* * * * *